United States Patent Office 3,698,870
Patented Oct. 17, 1972

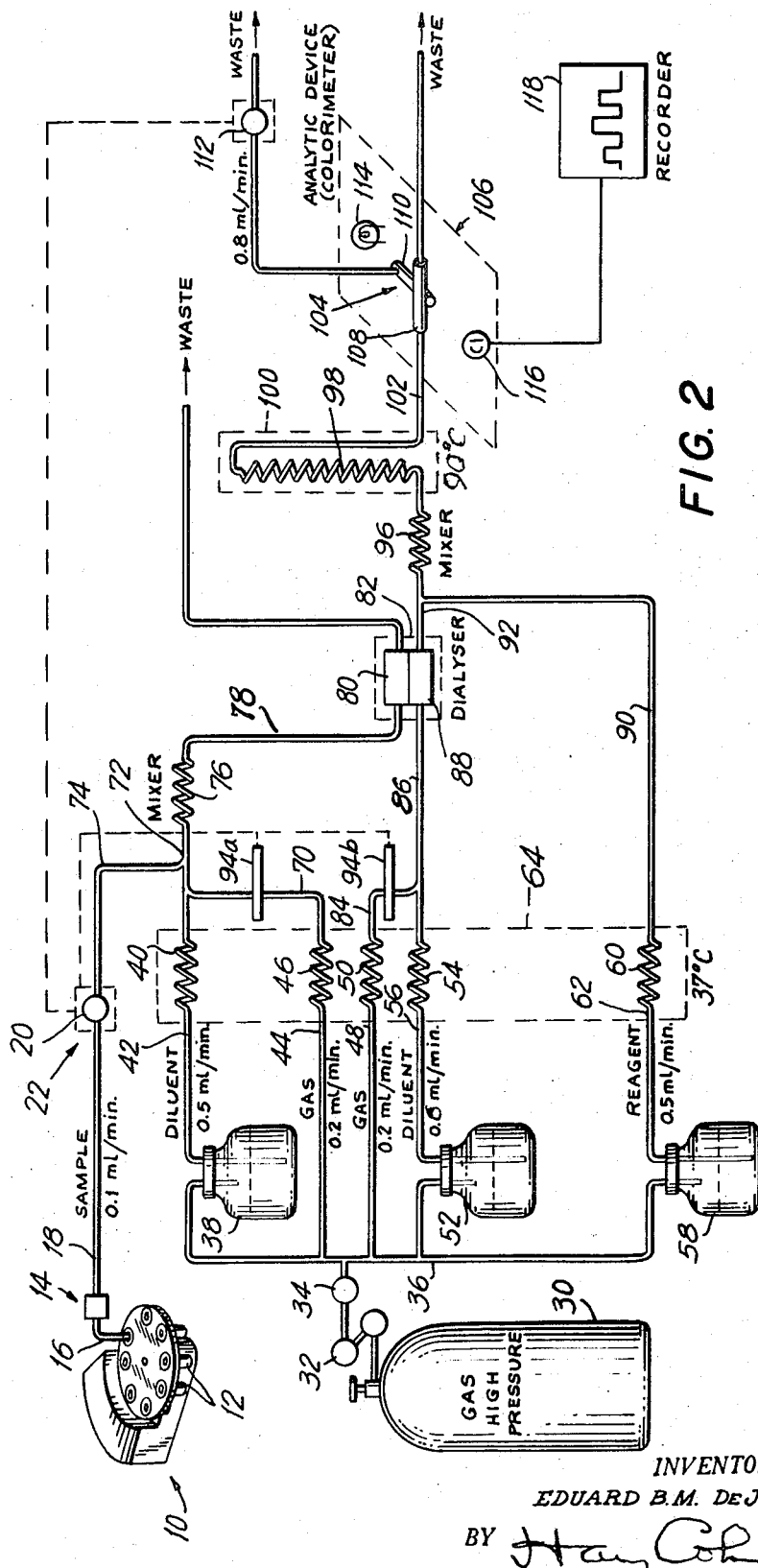

3,698,870
APPARATUS FOR PUMPING WITH VISCOSITY CONTROL
Eduard B. M. de Jong, Tilburg, Netherlands, assignor to Technicon Instruments Corporation, Tarrytown, N.Y.
Continuation-in-part of application Ser. No. 712,431, Mar. 12, 1968. This application Mar. 2, 1971, Ser. No. 120,153
Int. Cl. B67d 5/54; F04f 1/00; G01n 31/00
U.S. Cl. 23—253 R
10 Claims

ABSTRACT OF THE DISCLOSURE

A pump system for sample analysis apparatus including an analytical conduit of relatviely low fluid-flow resistance and which is subject to variations in resistance and having an end coupled to either end of a second conduit to either receive from or supply to the analytical conduit a fluid caused to flow through both conduits. The second conduit has a relatively high resistance to fluid flow, and temperature control is provided for maintaining the high resistance portion of the second conduit at a substantially constant temperature for precluding variations in the resistance thereof and in the viscosity of the fluid passing through it, so that the rate of flow along the analytical conduit is maintained substantially constant.

This application is a continuation-in-part of application Ser. No. 712,431 filed Mar. 12, 1968, now abandoned.

BACKGROUND OF THE INVENTION

(1) Field of the invention

This invention relates to a means for providing a continuous uniform flow of liquid through a conduit which may or may not be segmentized by segments of a different liquid or a gas which is immiscible therewith.

(2) Background of the invention

A continuous, uniform flow of liquids is highly advantageous in automatic analysis systems particularly, and in any other systems. While this discussion will be directed to a method and means for providing a continuous, uniform flow of liquid in a continuous flow, automatic analysis system, it will be appreciated that such a method and means has utility in many other environments.

In automatic analysis systems of the type first shown by L. T. Skeggs in U.S. Pat. No. 2,297,149, issued June 25, 1957, a plurality of liquid samples are successively transmitted through a conduit as a flowing stream; are successively treated, as by the addition of a suitable reagent, heating, etc.; and are successively analyzed, as in a colorimeter or a flame photometer. Successive samples customarily are spaced apart by a segment of a therewith immiscible fluid, which may be a gas or liquid; and each sample itself may be divided by segments of immiscible fluid. These segments serve to compartmentalize a quantity of sample with a proportional quantity of reagent to obtain uniform intermixing thereof; and to cleanse the inner walls of the conduits. In U.S. 2,797,149 a peristaltic type pump is utilized to advance the various fluids: sample liquid, segmentizing air, reagent liquid, through the conduits, by successive fingers which occlude resiliently compressible pump tubes along their length. An improved type of peristaltic pump is shown by A. Ferrari, Jr., et al., in U.S. Pat. No. 2,935,028, issued May 3, 1960, wherein rollers occlude the pump tubes progressively. A yet further improved peristaltic type pump and a discussion of the continuity of the flows provided by peristaltic type pumps in analytic systems is shown by W. J. Smythe in U.S. Pat. No. 3,306,229, issued Feb. 28, 1967. The flows which are involved in commercial systems range roughly from .005 cc./min. to 4.0 cc./min.

Other schemes have been proposed for advancing liquids at a continuous, uniform rate. One proposal provides a gas powered arrangement for continuously uniformly atomizing a sample liquid from a container into the flame of a flame photometer. Essentially, a source of gas at a regulated high pressure passes initially through a high resistance and subsequently through a low resistance which includes the liquid vessel and the burner. Fluctuations in the resistance of the low resistance and burner have little effect on the rate of flow of gas, which rate of flow is essentially controlled by the high resistance. The liquid rate of flow in this system is reasonably independent of viscosity differences, temperature changes, partial clogging of the liquid line, etc. However, it is very important to note that this is true only under steady state conditions, that is, for the asymptotic case, where the liquid flow approaches an equilibrium value, as does the pressure in the sample containing vessel and the gas into that vessel. Until equilibrium is established, none of these is constant. Using this system with the very small volume of the container shown therein, the time delay to reach equilibrium may be of the order of 0.5 to 1.0 minute. In a larger system, such as in the system shown by Skeggs, where the air volume in the vessel may be about 500 ml. the equilibrium time would be of the order of 15.0 to 30.0 minutes. Thus, such a system compensates for very slow changes but not for transient changes.

SUMMARY OF THE INVENTION

Accordingly, it is an object of this invention to provide a system for advancing liquids at a continuous, uniform rate, and which is rapid in response to transient changes, that is, substantially no time delay is required to build up gas pressure in a liquid vessel, and hence no appreciable delay in liquid flow rate results. In one embodiment of this invention, there is provided a system including a source of gas at a regulated high pressure which passes initially into the liquid vessel to subsequently propel liquid through a high resistance, and finally through a low resistance which includes the treatment manifold and analytical device such as a colorimeter. This feature of high, constant gas pressure being applied to the liquid vessel provides a fast response to transient changes; that is, no time delay is required to build up the pressure in the liquid vessel, and, hence, no appreciable lag in the liquid flow rate results. Advantageously, the high resistance may be a capillary tube and is maintained at a constant temperature to preclude any changes in the viscosity of the liquid.

BRIEF DESCRIPTION OF THE DRAWING

These and other objects, features and advantages of the invention will be apparent from the following specification thereof, taken in conjunction with the accompanying drawing in which:

FIG. 1 is a schematic drawing illustrating the principle of the invention;

FIG. 2 is a schematic drawing of examplary analytic manifold embodying the invention, being a manifold for the determination of the concentration of glucose in each of a series of blood samples.

DESCRIPTION OF THE INVENTION

Figure 3:
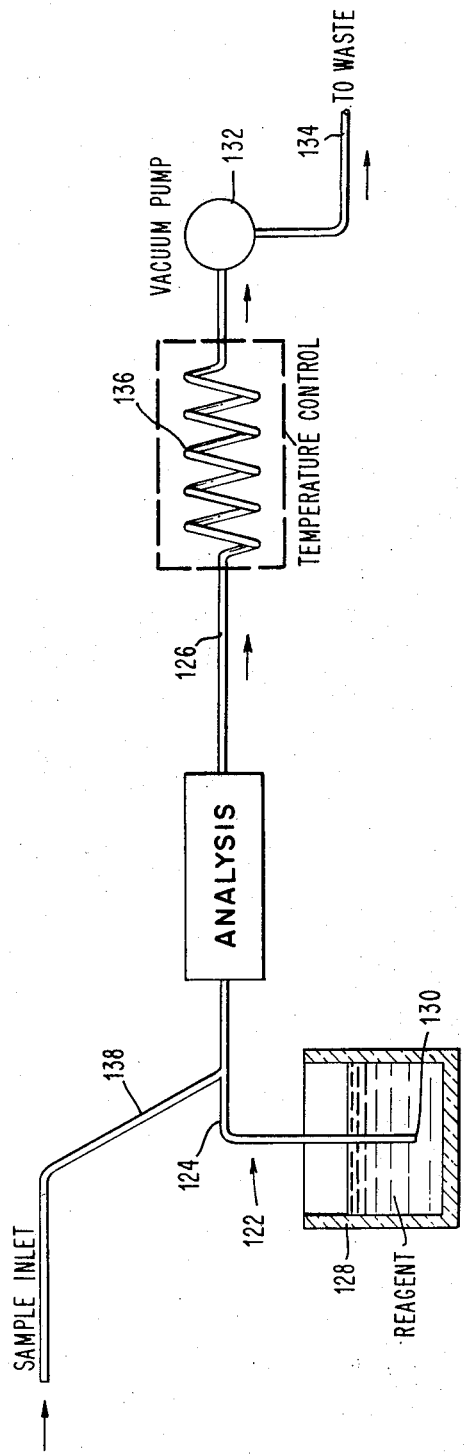
FIG. 3 is a diagrammatic view illustrating a modified form of the pump system of the invention.

An equivalent diagram of the principle of this invention is contained in FIG. 1. As shown, the system includes in series:

S, which is a high pressure regulated source of gas;

$R_1$, which is a high resistance, and may comprise a length of capillary tubing having a relatively high flow resistance; and $R_2$, which is the relatively low flow resistance provided by the treatment and analytical manifold.

Thus, there are:

$P_1$, which is the driving pressure;
$P_2$, which is the pressure downstream of $R_1$; and
$P_3$, which is the discharge pressure, here atmospheric pressure.

The flow Q through the system is proportional to $P_1-P_3$, and is inversely proportional to $R_1+R_2$, assuming no gravitational head. Thus:

$$Q = \frac{P_1 - P_3}{R_1 + R_2}$$

The complete treatment and analytical manifold of a commercial instrument developes about 20 cm. $H_2O$ pressure. If $P_1$ is regulated at one atmosphere gage pressure, then $P_1-P_3=1033$ cm. $H_2O$, and $P_1-P_2=1013$ cm. $H_2O$. Thus:

$$R_2/R_1 = 20/1013$$

Thus, the major determinants of the flow are $P_1$ and $R_1$, and substantial percentage changes in $R_2$, which includes the treatment and analytical manifold, will not appreciably affect the flow Q. For example, an increase of $R_2$ by 100% would result in merely a 2% change in flow Q.

It will be appreciated that it is highly advantageous to maintain the resistance tubing at a constant temperature, so as to avoid variations in the viscosity of the fluids flowing therethrough so that the rates of flow will not vary.

A system for the automatic analysis of blood samples for glucose concentration is shown in FIG. 2.

A sample supply apparatus 10, such as is shown by J. Isreeli et al., in U.S. Pat. No. 3,230,776 issued Jan. 25, 1966, supports a plurality of sample containers 12, and intermittently presents a container to an off-take device 14, having an off-take tube 16. The off-take tube is inserted into the presented thereto sample container for the removal of the sample liquid therefrom. The downstream end of the off-take tube is coupled by a conduit 18 to the upstream end of a pump tube 20 in a peristaltic type pump such as is shown in U.S. Pat. No. 3,306,229, supra. The pump has a plurality of rollers, not shown, which progressively compress the pump tube to advance the sample liquid therethrough and to aspirate the sample liquid from the sample container.

A tank of gas 30, under high pressure, such as nitrogen at 2200 p.s.i., is coupled through a first pressure regulator 32 and a second regulator 34 to a manifold 36, which it maintains at a constant pressure, such as 66.8 cm. Hg.

A flask 38 of diluent, such as water, has a short inlet tube which is coupled to the manifold, and a long outlet tube which is coupled to the inlet of a high resistance coil 40 by a conduit 42. A conduit 44 couples the manifold to a high resistance coil 46. A conduit 48 couples the manifold to a high resistance 50. A flask 52 of diluent, such as water, has a short inlet tube which is coupled to the manifold, and a long outlet tube which is coupled to a high resistance coil 54 by a conduit 56. A flask 58 of a reagent, such as ferricyanide, has a short inlet tube which is coupled to the manifold, and a long outlet tube which is coupled to a high resistance coil 60 by a conduit 62.

The internal diameters of the high resistance coils 40, 46, 50, 54 and 60 are made relatively small, for example, 0.010 inch or 0.25 mm. and the length relatively long, for example, on the order of 210 inches for liquids, to provide the desired high impedance and resultant flow rate. In this particular example, sample liquid flows through pump tube 20 at 0.1 ml./min., water through coil 40 at 0.5 ml./min., nitrogen through coil 46 at 0.2 ml./min., nitrogen through coil 50 at 0.2 ml./min., water through coil 54 at 0.6 ml./min. and ferricyanide solution at 0.5 ml./min. The coils are disposed in a temperature control bath 64 operating at 37° C., to maintain the fluids passing through the coils at a constant temperature and viscosity. Advantageously, the flasks 38, 52 and 58, and the coupling conduits, may also be disposed in the temperature control bath or a similar service.

The high resistance coils provide a rate of flow therethrough which varies linearly in response to the pressure differential thereacross. Therefore, a common change in the pressure across all of the coils will produce a uniform, proportional change in the rate of flow.

A conduit 70 from the coil 46 merges into the conduit 72 from the coil 40, to provide a gas segmentized stream of diluent. The conduit 74 from the pump tube 20 subsequently merges with the conduit 72, to add sample liquid to the segments of diluent. The conduit 72 leads into a horizontal mixing coil 76, such as is shown by A. Ferrari, Jr., in U.S. Pat. No. 2,933,293, issued Apr. 19, 1960. A conduit 78 couples the outlet of the mixing coil to the inlet of the donor passageway 80 of a dialyzer 82 such as is shown by J. Isreeli in U.S. Pat. No. 3,333,706, issued Aug. 1, 1967. The outlet of the passageway 80 is coupled to waste.

A conduit 84 from the coil 50 merges into a conduit 86 from the coil 54, to provide a gas segmentized stream of diluent. The conduit 86 leads to the donee passageway 88 of the dialyzer 82, for the transfer of sample through the membrane of the dialyzer into the segments of diluent. A conduit 90 from the coil 60 merges with a conduit 92 from the outlet of the donee passageway 88 to add reagent to the segments of sample containing diluent. The phasing of the gas segments in the streams through the donor and donee passageways may advantageously be controlled by valves as shown in U.S. Pat. No. 3,306,229, supra. The conduit 70 includes a resiliently compressible portion which is normally occluded by a portion 94a of a pinch bar, and the conduit 84 includes a resiliently compressible portion which is normally occluded by a portion 94B of the pinch bar. The pump periodically releases the pinch bar to pass gas through the conduits. The lengths of the conduits from the pinch bar to the dialyzer are selected so as to provide concurrent and coextensive gas segments to the donor and donee passageways. The conduit 92 leads to a horizontal mixing coil 96 whose outlet is coupled to a reaction coil 98 in a heating bath 100, such as is shown by J. Isreeli in U.S. Pat. No. 3,057,603, issued Oct. 9, 1962. The coil may have an internal diameter of 2 mm. and be maintained at 90° C.

The outlet of the reaction coil is coupled by a conduit 102 to the inlet of a flow cell 104 in a colorimeter 106. The flow cell may be of the type shown by L. T. Skeggs in U.S. patent application Ser. No. 556,749, filed June 10, 1966, now U.S. Pat. 3,518,008, issued June 30, 1970. The flow cell has an upper passageway 108 having an inlet coupled to the conduit 102 and an outlet which is coupled to waste; and has a lower sight passageway 110 having an upper inlet which merges with an intermediate, lower outlet in the passageway 108 and an outlet which is coupled to a pump tube 112. The pump tube 112 is in the peristaltic type pump 22, and draws a stream of treated sample liquid, without gas segments, through the sight passageway and thence to waste; for example, at a rate of 0.8 ml./min. Alternatively, the removal of the gas segments upstream of the sight passageway may be omitted, and the complete stream, including the gas segments, may be sent through the flow cell as shown in U.S. patent application Ser. No. 369,695, filed May 25, 1964 by W. J. Smythe et al. The colorimeter 106 includes the customary light source 114, filters (not shown), and light detector 116, which detector is coupled to a recorder 118. The colorimeter-recorder system may be of the type shown by M. H. Pelavin in U.S. Pat. No. 3,236,148, issued Feb. 22, 1966.

Although a particular manifold for a particular determination, glucose, has been utilized to illustrate the invention; it will be appreciated that this invention in pressure resistance pumping may be utilized with other manifolds, and other detectors, such as a flame photometer. Other manifolds, which may or may not include dialyzers, heating baths or colorimeters, are known, and some are illustrated by L. T. Skeggs et al. in U.S. Pat. No. 3,241,432, issued Mar. 22, 1966. The regulated pressure manifold and high resistance coil of this invention may be substituted for most of the pump tubes shown in that patent. Further, a flame photometer, such as is shown by J. Isreeli in U.S. Pat. No. 3,177,758, issued on Apr. 13, 1965, may be substituted for the colorimeter shown, in appropriate manifolds, that is, for the determination of sodium and potassium, as indicated in U.S. 3,241,432, supra.

The concept of a pump system for analysis apparatus discussed above with reference to the embodiment shown in FIG. 2 is also embodied in the modified form of the invention shown in FIG. 3, which concept includes the utilization of a relatively high resistance portion of a fluid system, under the influence of temperature control, to obtain a substantially constant fluid flow rate in a relatively low resistance portion of the system which would otherwise be subject to instability such as to cause significant changes in the flow rate in the low resistance portion. It is believed it has been made clear from the foregoing that the low resistance portion of the system includes that part of the system where analysis takes place. Also, that, to obtain precise and accurate analysis, especially with small amounts of fluid or fluids, it is necessary to achieve a flow rate that remains substantially constant during analysis.

In the form of the system illustrated by way of example in FIG. 3, there is provided a fluid conduit, indicated generally at 122, having a portion thereof indicated at 124 and another portion 126 forming an extension of the portion 124. Fluid is caused to flow in the conduit 122 by the creation of a pressure differential therein, as in the form illustrated in FIG. 2. This fluid is a liquid which may be a sample stream but it is illustrated as a stream of reagent from a reservoir 128.

The reagent may be pushed or pulled in the conduit 122 so as to pass from the inlet end thereof through the portion 124 and through the portion 126. However, in the illustrated form the inlet end 130 of the conduit 122 is immersed in the reagent and a vacuum pump 132 interposed in the conduit portion 126 is effective to create a pressure differential to cause the reagent to flow in the conduit 122. The conduit 122 has a discharge end 134 downstream of the pump 132 which may be directed to waste, or other appropriate disposition may be made of the fluid flowing from the discharge end 134. It will be noted that the reagent reservoir 128 is not pressurized as it is in the form of FIG. 2 but may be open to the atmosphere as shown; and that the vacuum pump 132 serves the function of displacing the fluid in the conduit 122 which function in the form of FIG. 2 previously discussed is performed by the container 30 of gas under high pressure.

It is also to be noted that in the form of FIG. 3 there is a reversal of the relatively high and relatively low resistance portions of the system, that is, in the form of FIG. 3 the low resistance portion of the system is upstream of the high resistance portion of the stream flowing to the outlet 134 of the conduit 122. As shown in FIG. 3, the analysis part of the system, which has a relatively low resistance, is interposed in the conduit portion 124 which has a relatively low resistance, and a resistor 136 having a relatively high resistance is interposed in the conduit portion 126 downstream from the analysis part of the system. The resistor 136, like the resistor 40 of the form of FIG. 2, for example, is temperature controlled to maintain the temperature of the resistor 136 substantially constant by an element which may be similar to the element 64 described with reference to the form of FIG. 2 of the invention. As in the form of FIG. 2, this temperature control of the resistor tends to maintain constant a number of factors which influence fluid flow rates such as the diameter of the conduit forming the resistor and the viscosity of the fluid flowing therethrough.

The introduction of sample to the stream flowing in the conduit 122 must be upstream, of course, from the analysis part of this system and is so shown in FIG. 3. The sample inlet is indicated at 138. It is believed made clear from the foregoing that, if desired, the relatively high and relatively low resistance portions of the system may be reversed with the high resistance portion of the system being upstream of the low resistance portion thereof in the conduit 122.

The sample may be supplied from a sampler such as the apparatus 10 previously described or may be supplied in another manner by conventional means. The flow of sample in the sample inlet 138 may be achieved by the use of a pump of the peristaltic type such as discussed with reference to the form of FIG. 2 or other means may be provided to flow sample into the inlet 138 such as the action of the vacuum pump 132 in the conduit 122 for example. It will be obvious to those skilled in the art that, if desired, both pressure and vacuum pumps or one or the other may be utilized to create flow in the fluid conduit 122 or the sample inlet 138.

The analysis part of the system illustrated in FIG. 3 may include a colorimeter. However, it will be obvious to those skilled in the art that the pump system of the invention may be utilized with analysis means other than a colorimeter.

While there have been shown and described presently preferred embodiments of the invention, it will be understood that the invention may be embodied otherwise than as herein specifically illustrated or described and that certain changes in the details of construction and in the form and arrangement of parts may be made without departing from the underlying idea or principles of the invention. Accordingly, the invention is not limited to the prior constructions shown or described herein, except as may be required by the scope of the appended claims.

What is claimed is:

1. A pump system for analysis apparatus, comprising:
   a conduit, having an inlet and an outlet, including a first portion interposed intermediate said inlet and said outlet and a second portion interposed intermediate said inlet and said outlet, one of said conduit portions having a relatively high resistance to the passage of fluid therealong and the other of said conduit portions having a relatively low fluid flow resistance, the last-mentioned conduit portion including analytical conduit means which is subject to variations in resistance;
   a container for liquid to be flowed;
   conduit means coupling said container and said conduit inlet;
   means for causing a flow of liquid from said container to said inlet and then through said conduit to said outlet; and
   temperature control means for maintaining said high resistance portion of said conduit at a substantially constant temperature for precluding variations in the resistance thereof and in the viscosity of said liquid passing therethrough, whereby, the rate of flow along said analytical conduit means is maintained substantially constant.

2. A pump system for an analytical conduit means, which analytical conduit means has a continuous flow and relatively low fluid flow resistance, and which resistance is subject to variation, for transmitting fluids, including liquids, therethrough at a substantially constant rate of flow despite any such variation in resistance, including:
- a sealed container for a liquid to be pumped;
- said container having an inlet for gas and an outlet for liquid;
- means for supplying gas at a constant pressure to said inlet to pass liquid from said container along said outlet;
- first conduit means for receiving said liquid, said first conduit means being coupled to and between said outlet and said analytical conduit means and having a relatively high, constant fluid flow resistance; and
- temperature control means for maintaining said first conduit means at a substantially constant temperature for precluding variations in the viscosity of said liquid passing therethrough, whereby the rate of flow along said analytical conduit means is maintained substantially constant.

3. A pump system according to claim 2, further including:
- an additional conduit means having a relatively high, constant fluid flow resistance, coupled to and between said means for suplying gas and said analytical conduit means; and
- temperature control means for maintaining said additional conduit means at a substantially constant temperature for precluding variations in the viscosity of said gas passing therethrough.

4. A system according to claim 2 wherein said means for supplying gas at a constant pressure includes
- a source of gas at a high pressure; and
- constant pressure regulator means.

5. A system according to claim 2 wherein said means for suplying gas at a constant pressure includes
- a container filled with gas initially at very high pressure;
- first constant pressure regulator means communicating with said container for transmitting gas therefrom at a constant, lesser high pressure;
- second constant pressure regulator means communicating with said first regulator means for transmitting gas therefrom at a constant, yet lesser high pressure.

6. A system according to claim 2 wherein said analytical conduit means includes a flow cell in a colorimeter.

7. A system according to claim 2 wherein said analytical conduit means includes a dialyzer and a heating bath.

8. A pump system according to claim 2, wherein a plurality of liquids are to be concurrently transmitted into said analytical circuit means, further including:
- a respective sealed container for each of said plurality of liquids, each container having a respective gas inlet and liquid outlet;
- a respective first conduit means coupled to and between said respective liquid container and said analytical conduit means and having a respective, relatively high, constant liquid flow resistance; and
- temperature control means for maintaining said respective first conduit means at a substantially constant temperature.

9. A pump system according to claim 2, wherein a gas is to be intermittently transmitted into said analytical conduit means, further including:
- an additional, relatively high, constant gas flow resistance in series with an intermittentlyl operable value coupled between said gas supply means and said analytical conduit means.

10. A system according to claim 8 wherein each of said first conduit means is a long tube, the rate of flow of a fluid therethrough varying linearly with the difference in pressure thereacross.

References Cited

UNITED STATES PATENTS

| | | | |
|---|---|---|---|
| 2,180,847 | 11/1939 | Nordell | 23—253 R |
| 2,755,979 | 7/1956 | Lawson et al. | 222—129.4 X |
| 2,879,140 | 3/1959 | Karasek et al. | 23—232 R |
| 2,880,912 | 4/1959 | Fisher | 222—129.4 |
| 2,967,764 | 1/1961 | Skeggs | 23—253 R |
| 3,194,444 | 7/1965 | Hubert | 137—205.5 |
| 3,284,164 | 11/1966 | Hach | 23—253 R |
| 3,366,149 | 1/1968 | Taft et al. | 23—253 RX |
| 3,472,628 | 10/1969 | Hrdina | 23—230 R |
| 3,488,154 | 1/1970 | Hronas | 23—230 R |

JOSEPH SCOVRONEK, Primary Examiner

U.S. Cl. X.R.

23—259; 137—209